(12) United States Patent
Liao et al.

(10) Patent No.: US 12,335,420 B2
(45) Date of Patent: Jun. 17, 2025

(54) ROTATING SHAFT MECHANISM AND FOLDABLE TERMINAL DEVICE

(71) Applicant: HUAWEI TECHNOLOGIES CO., LTD., Guangdong (CN)

(72) Inventors: Changliang Liao, Dongguan (CN); Ding Zhong, Dongguan (CN); Tao Huang, Dongguan (CN); Yong Liu, Dongguan (CN); Yangming Lin, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 348 days.

(21) Appl. No.: 17/947,396

(22) Filed: Sep. 19, 2022

(65) Prior Publication Data

US 2023/0019951 A1    Jan. 19, 2023

Related U.S. Application Data

(63) Continuation of application No. PCT/CN2020/108502, filed on Aug. 11, 2020.

(30) Foreign Application Priority Data

Mar. 20, 2020   (CN) .......................... 202010202791.1

(51) Int. Cl.
*H04M 1/02* (2006.01)
*G06F 1/16* (2006.01)

(52) U.S. Cl.
CPC ....... *H04M 1/0216* (2013.01); *H04M 1/0268* (2013.01)

(58) Field of Classification Search
CPC .......................... H04M 1/0216; H04M 1/0268
USPC ...................................................... 455/575.3
See application file for complete search history.

(56) References Cited

U.S. PATENT DOCUMENTS 8,860,765 B2   10/2014   Kilpatrick, II et al.
9,127,709 B2   9/2015    Shan

FOREIGN PATENT DOCUMENTS

| CN | 109830185 A | 5/2019 |
| CN | 110784570 A | 2/2020 |
| KR | 102036913 B1 | 10/2019 |

OTHER PUBLICATIONS

Office Action with English translation issued in IN202217056996, dated Aug. 12, 2024, 7 pages.

*Primary Examiner* — Mark G. Pannell

(57) ABSTRACT

A rotating shaft mechanism is disclosed. The rotating shaft mechanism includes a main bracket and at least one rotating assembly. Each rotating assembly can rotate relative to the main bracket. The rotating assembly includes a rotating member, a middle frame, and a sliding member. The rotating member can be rotatably connected to the main bracket about the first rotation center, and the other end of the rotating member can be rotatably connected to the middle frame about the third rotation center. One end of the sliding member is hinged to the main bracket, and the sliding member can rotate relative to the main bracket about the second rotation center. The other end of the sliding member slidably coordinates with the middle frame, so that the middle frame is away from or close to the second rotation center along an extension direction of the sliding member.

18 Claims, 16 Drawing Sheets

ROTATING SHAFT MECHANISM AND FOLDABLE TERMINAL DEVICE

CROSS-REFERENCE TO RELATED APPLICATIONS

This application is a continuation of International Application No. PCT/CN2020/108502, filed on Aug. 11, 2020, which claims priority to Chinese Patent Application No. 202010202791.1, filed on Mar. 20, 2020. The disclosures of the aforementioned applications are hereby incorporated by reference in their entireties.

TECHNICAL FIELD

This application relates to the terminal device field, and in particular, to a rotating shaft mechanism and a foldable terminal device.

BACKGROUND

With development of science and technology, a flexible screen technology gradually becomes mature. This leads to a great change in a display mode of a terminal device that uses a flexible screen. In an example of a foldable mobile phone, a flexible screen of the foldable mobile phone can flexibly change based on different use scenarios to switch between use modes. This is also a research direction of current mobile phone manufacturers.

For a terminal device such as a foldable mobile phone, a flexible screen is only a part of its structure, and a rotating shaft mechanism is further needed to implement foldability of the whole terminal device. Currently, the flexible screen in the foldable terminal device mainly has two development directions: sliding screen type and fixed screen type. Specifically, the sliding screen type refers to that in a folding process, the flexible screen slides on a structural member along with a motion of the rotating shaft mechanism; when the flexible screen is unfolded, a structure of the structural member is not stable enough, and a specific pulling force is exerted on the flexible screen; and when the flexible screen is folded, a sliding or squeezing problem may occur. The fixed screen type refers to that the flexible screen is fixed relative to a structural member of the device; the rotating shaft mechanism changes along with the flexible screen in a folding process of the device; and the rotating shaft mechanism is complex, has a poor anti-reverse-folding capability, and is prone to damaging the flexible screen.

Therefore, current rotating shaft mechanisms configured to coordinate with a flexible screen in folding and unfolding all have a problem of structural instability, and there is a risk of damaging the flexible screen in folding and unfolding processes.

SUMMARY

This application provides a rotating shaft mechanism and a foldable terminal device. The rotating shaft mechanism can achieve a good support effect for a flexible screen in the foldable terminal device, and can reduce a failure risk of the flexible screen.

According to a first aspect, this application provides a rotating shaft mechanism. The rotating shaft mechanism may be applied to a foldable terminal device. The foldable terminal device may be a foldable mobile phone or a foldable tablet computer. The rotating shaft mechanism includes a main bracket and at least one rotating assembly. The main bracket bears and supports a whole structure. Each rotating assembly can rotate relative to the main bracket, so as to achieve a folding or unfolding effect of the rotating assembly relative to the main bracket. A limiting structure configured to limit a maximum stroke of rotation performed by the rotating assembly relative to the main bracket is further disposed between the main bracket and the rotating assembly. In a coordinating structure formed by the main bracket and any rotating assembly, a first rotation center and a second rotation center are formed on the main bracket. Each rotating assembly includes a rotating member, a sliding member, and a middle frame. A third rotation center is formed on the middle frame. Axes of the first rotation center, the second rotation center, and the third rotation center are parallel to each other. The rotating member includes a first connecting portion, a second connecting portion, and a main body portion connected between the first connecting portion and the second connecting portion. The first connecting portion can be rotatably connected to the main bracket about the first rotation center. Therefore, the rotating member can rotate relative to the main bracket about the first rotation center. The second connecting portion can be rotatably connected to the middle frame about the third rotation center. Therefore, the middle frame can rotate relative to the rotating member about the third rotation center. One end of the sliding member can be rotatably connected to the main bracket about the second rotation center, and specifically, the sliding member can be hinged to the second rotation center on the main bracket. In addition, the other end of the sliding member slidably coordinates with the middle frame, so that the middle frame is away from or close to the second rotation center along an extension direction of the sliding member. At this point, the rotating member can rotate relative to the main bracket about the first rotation center. The middle frame can rotate relative to the rotating member about the third rotation center. One end of the sliding member can rotate relative to the main bracket about the second rotation center, and the other end of the sliding member can slide relative to the middle frame. Therefore, the whole rotating shaft mechanism is limited to only one degree of freedom, so that the middle frame can finally rotate relative to the main bracket to implement folding and unfolding effects. When the rotating assembly is in an unfolded state relative to the main bracket, a bearing surface of the main bracket and a bearing surface of the middle frame are located on a same plane. A structure of the whole rotating shaft mechanism is simple, has a small vacant position, and has relatively high stability. When the rotating shaft mechanism is applied to the foldable terminal device, the bearing surface of the main bracket and the bearing surface of the middle frame are configured to bear a flexible screen of the foldable terminal device. This can achieve a good support effect for the flexible screen. In addition, provided that positions of the first rotation center and the third rotation center are properly arranged, the flexible screen of the foldable terminal device does not slide relative to the rotating shaft mechanism in folding and unfolding processes, thereby reducing a failure risk of the flexible screen.

In a possible implementation, the rotating member is implemented by using two connected arc structures. Specifically, the first connecting portion and the second connecting portion of the rotating member are both arc structures, and a concave surface of the first connecting portion and a concave surface of the second connecting portion both face a side on which the bearing surface of the middle frame is located. Positions of the first connecting portion and the second connecting portion are equivalent to being left-right symmetrical (certainly, the structures are not necessarily symmetrically the same). A center of circle corresponding to the first connecting portion coincides with the first rotation center, and a center of circle corresponding to the second connecting portion coincides with the third rotation center. A first arc sliding slot is formed on the main bracket, and the first connecting portion extends into the first arc sliding slot to slidably coordinate with the first arc sliding slot. When the first connecting portion slides along the first arc sliding slot, the rotating member is equivalent to rotating relative to the main bracket about the first rotation center. A second arc sliding slot is formed on the middle frame, and the second connecting portion extends into the second arc sliding slot to slidably coordinate with the second arc sliding slot. When the second connecting portion slides along the second arc sliding slot, the middle frame is equivalent to rotating relative to the rotating member about the third rotation center. In a process in which the middle frame rotates relative to the main bracket, the first connecting portion does not protrude from the bearing surface of the main bracket, and the second connecting portion does not protrude from the bearing surface of the middle frame, so that the rotating member does not affect an external structure of the rotating shaft mechanism when the rotating shaft mechanism is in a folded state. The rotating shaft mechanism can be more conveniently applied to the foldable terminal device.

As described above, the rotating shaft mechanism may be applied to the foldable terminal device, so as to implement folding and unfolding of the flexible screen. Therefore, in a possible implementation, a first screen support member is further disposed on the rotating member, and may be configured to support an external structure such as the flexible screen. When the rotating assembly is in the unfolded state relative to the main bracket, a bearing surface of the first screen support member, the bearing surface of the main bracket, and the bearing surface of the middle frame are located on the same plane. The first screen support member herein may be fixed on the rotating member through bonding, welding, riveting, screw connection, or another manner.

In a possible implementation, a second screen support member may be movably disposed between the first screen support member and the main bracket, and a third screen support member may be movably disposed between the first screen support member and the middle frame. The second screen support member and the third screen support member may also be configured to support an external structure. When the rotating assembly is in the unfolded state relative to the main bracket, a bearing surface of the third screen support member, the bearing surface of the first screen support member, the bearing surface of the main bracket, and the bearing surface of the middle frame are located on the same plane.

The second screen support member is movable. To limit the second screen support member between the first screen support member and the main bracket, the first screen support member and the main bracket may be made to coordinate to form an overlapping surface, and the second screen support member overlaps the overlapping surface. Similarly, for the second screen support member disposed between the first screen support member and the middle frame, the first screen support member and the middle frame are made to coordinate to form an overlapping surface, and the second screen support member overlaps the overlapping surface.

The limiting structure of the rotating shaft mechanism can limit the maximum stroke of rotation performed by the rotating assembly relative to the main bracket. For rotation of the rotating assembly relative to the main bracket into a folded state, in a possible implementation, the limiting structure of the rotating shaft mechanism may include a first limiting surface formed on the main bracket and a second limiting surface formed on the middle frame. When the rotating assembly rotates relative to the main bracket into the folded state, the first limiting surface comes into contact and interference with the second limiting surface. For rotation of the rotating assembly relative to the main bracket into the unfolded state, in a possible implementation, the limiting structure further includes a limiting member that may be disposed between the main bracket and the middle frame. When the rotating assembly rotates relative to the main bracket into the unfolded state, the limiting member comes into contact and interference with the main bracket and the rotating assembly. Certainly, the limiting structure is not limited to the foregoing manner, and details are not described herein.

According to a second aspect, this application provides a foldable terminal device. The foldable terminal device may be a foldable mobile phone, a foldable tablet computer, or the like. The foldable terminal device may specifically include a flexible screen and any one of the foregoing rotating shaft mechanisms. The flexible screen is disposed on the side on which the bearing surface of the main bracket and the bearing surface of the middle frame are located. When the rotating assembly is folded or unfolded relative to the main bracket, the flexible screen is folded or unfolded accordingly.

When there is only one rotating assembly in the rotating shaft mechanism, the flexible screen can only switch between the unfolded state and the folded state of the rotating assembly relative to the main bracket, and a folding angle is limited. Therefore, a rotating shaft mechanism with at least two rotating assemblies is proposed. Each rotating assembly can rotate relative to the main bracket. The at least two rotating assemblies can coordinate with the main bracket to implement a plurality of folding manners. The at least two rotating assemblies are divided into two groups: a first rotating group and a second rotating group. Rotating actions of all rotating assemblies in the first rotating group are synchronous. Rotating actions of all rotating assemblies in the second rotating group are synchronous. By controlling the two rotating groups, the rotating assembly in the first rotating group can rotate and be folded relative to the rotating assembly in the second rotating group. From a perspective of a structure of the whole rotating shaft mechanism, this is equivalent to realizing the folded and unfolded states of the rotating assemblies relative to the main bracket, and applying the rotating shaft mechanism to the foldable terminal device, so that the foldable terminal device has a larger folding range. Generally, the foldable terminal device has a flat-unfolded state and a folded state. Therefore, when each rotating assembly in the rotating shaft mechanism is unfolded relative to the main bracket, the flexible screen is in the flat-unfolded state.

In a possible implementation, the rotating assembly in the first rotating group and the rotating assembly in the second rotating group are symmetrically disposed in a one-to-one correspondence, so that stability of the rotating shaft mechanism can be further improved.

An area of the flexible screen in the foldable terminal device may be greater than the bearing surface of the main bracket and the bearing surface of the middle frame in the rotating shaft mechanism. To provide good support for the flexible screen, the foldable terminal device may further include a first main body and a second main body. A middle frame in the first rotating group is connected to the first main body, a middle frame in the second rotating group is connected to the second main body, and the first main body and the second main body are configured to bear the flexible screen.

Figure 1:
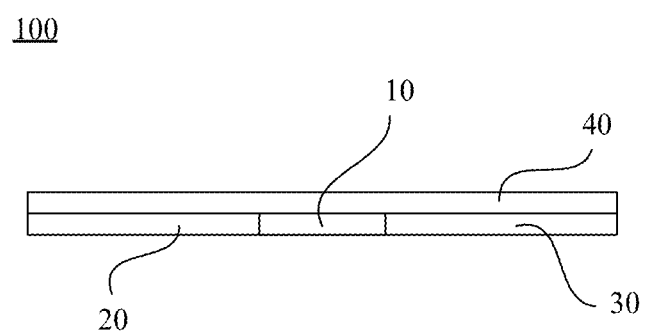
FIG. 1 is a schematic diagram of an unfolded state of a foldable terminal device according to this application.

Reference numerals: 1: main bracket; 11: first arc sliding slot; 12: arc sliding rail; 2: rotating assembly; 21: rotating member; 211: first connecting portion; 212: second connecting portion; 213: main body portion; 22: middle frame; 221: second arc sliding slot; 222: sliding slot; 223: sliding pin; 23: sliding member; 31: first limiting surface; 32: second limiting surface; 41: first screen support member; 42: second screen support member; 43: third screen support member; 10: rotating shaft mechanism; 20: first main body; 30: second main body; 40: flexible screen; and 100: foldable terminal device.

DESCRIPTION OF EMBODIMENTS

A foldable flexible screen is increasingly common in terminal devices such as a foldable mobile phone. However, currently, rotating shaft mechanisms that assist a flexible screen in folding and unfolding all have an unstable structure. In a process of folding and unfolding the flexible screen, the flexible screen may be damaged. On this basis, embodiments of this application provide a rotating shaft mechanism and a foldable terminal device provided with the rotating shaft mechanism. The rotating shaft mechanism has a more stable connecting structure, and can provide stable support for unfolding and folding of a flexible screen. To describe technical solutions in the embodiments of this application more clearly, the following describes in detail the rotating shaft mechanism and the foldable terminal device provided in the embodiments of this application with reference to accompanying drawings.

Figure 2:
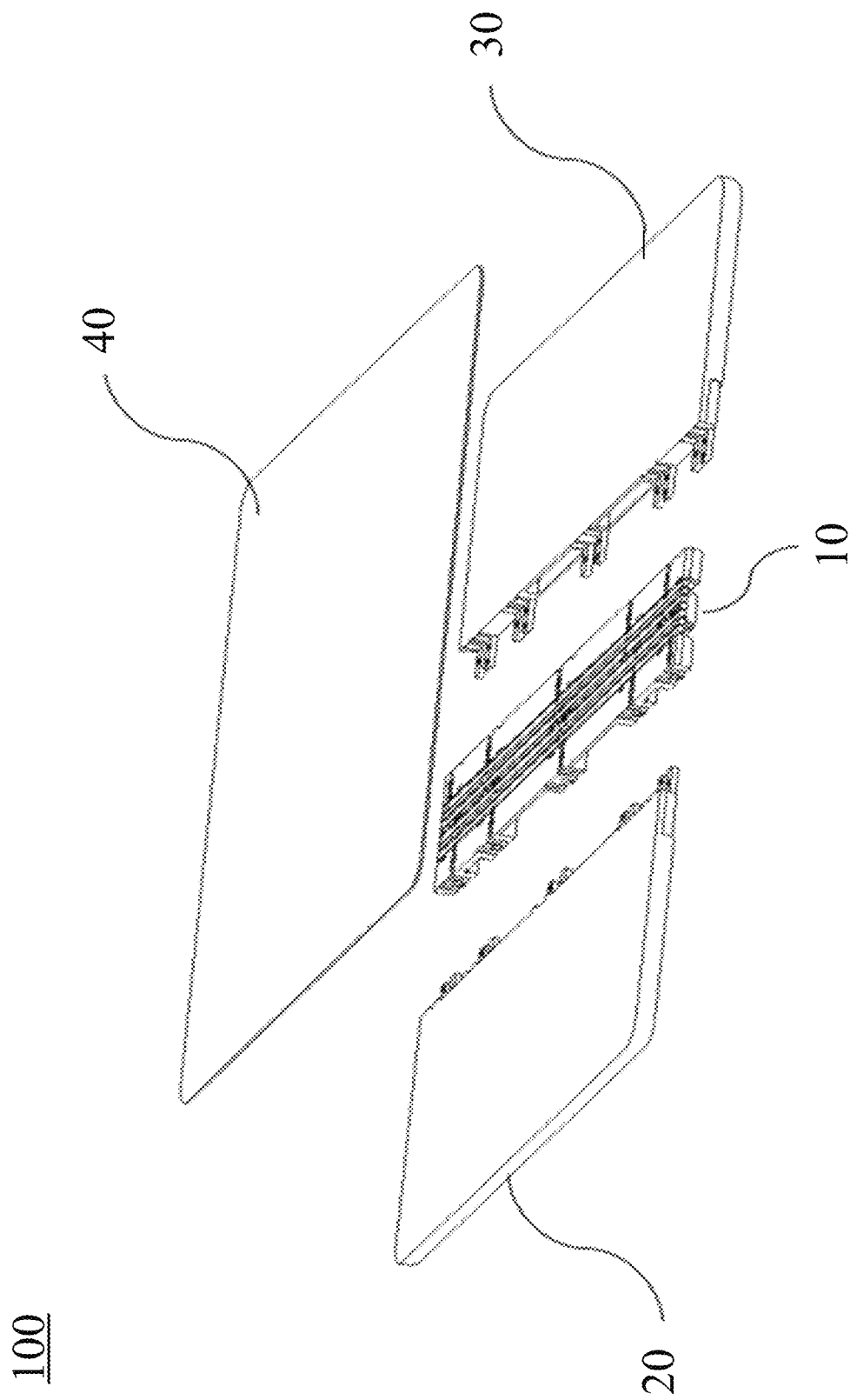
FIG. 2 is an exploded view of an unfolded state of a foldable terminal device according to this application.
Figure 3:
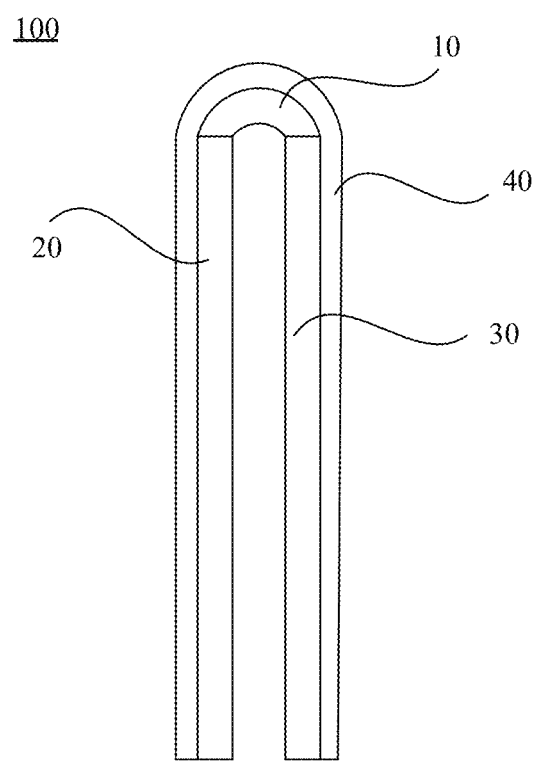
FIG. 3 is a schematic diagram of a folded state of a foldable terminal device according to this application.
Figure 4:
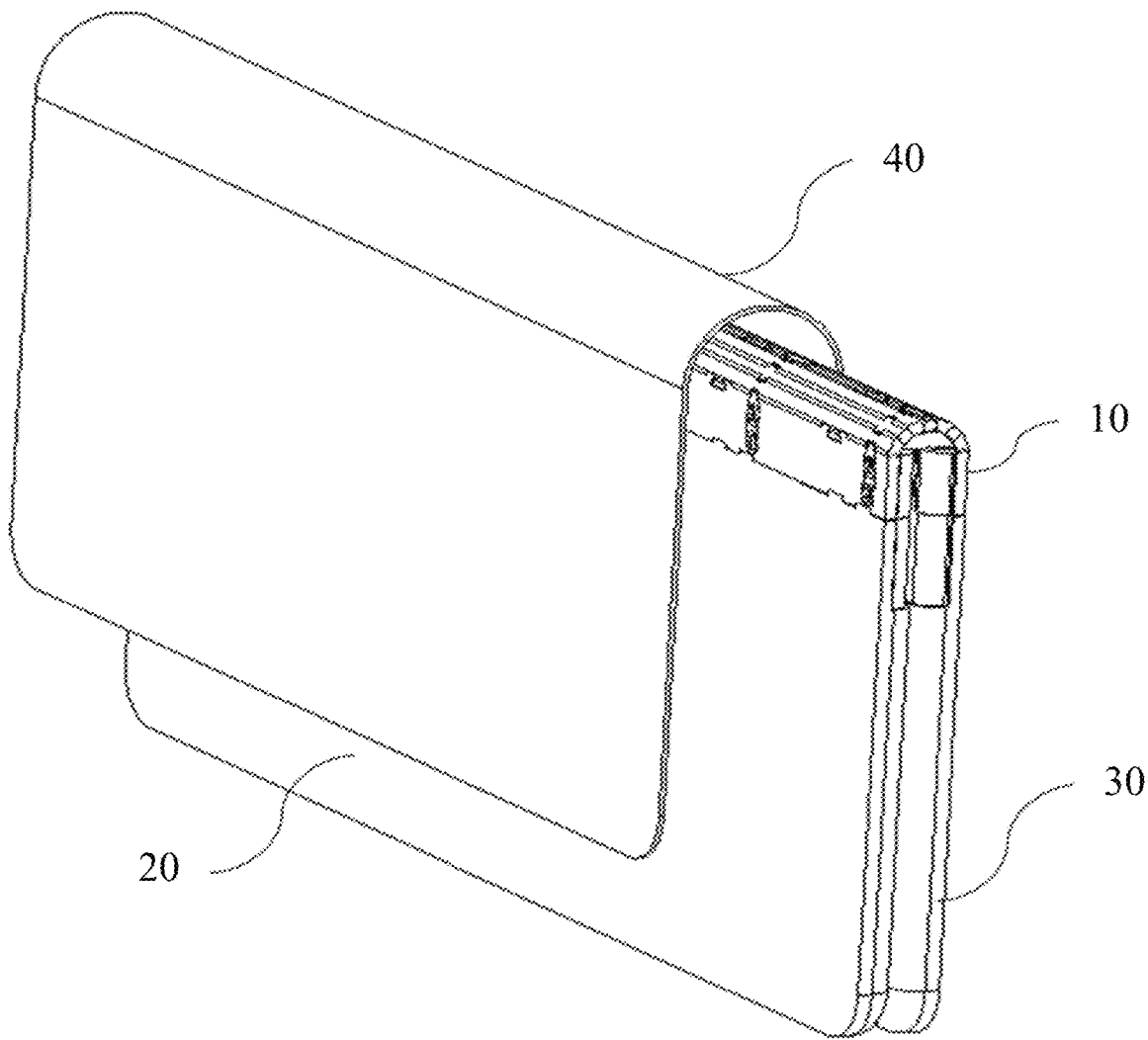
FIG. 4 is an exploded view of a folded state of a foldable terminal device according to this application.

FIG. 1 and FIG. 2 each are a schematic diagram of a structure of a foldable terminal device 100 according to an embodiment of this application. The foldable terminal device 100 herein may be a foldable mobile phone or a foldable tablet computer. This is not limited herein. FIG. 1 is a schematic diagram of a structure of the foldable terminal device 100 in an unfolded state. The foldable terminal device 100 may include a first main body 20, a second main body 30, a flexible screen 40, and a rotating shaft mechanism 10. The first main body 20 and the second main body 30 are equivalent to being located on a same plane. One end of the flexible screen 40 is fixed on the first main body 20, and the other end of the flexible screen 40 is fixed on the second main body 30. One end of the rotating shaft mechanism 10 is connected to the first main body 20, and the other end thereof is connected to the second main body 30. In addition, the rotating shaft mechanism 10 may further provide support for the flexible screen 40. To facilitate understanding of the structure of the foldable terminal device 100, further refer to an exploded view of the foldable terminal device 100 in the unfolded state shown in FIG. 2. At this point, the rotating shaft mechanism 10 is in an unfolded state. When the rotating shaft mechanism 10 is folded, the first main body 20 is driven to rotate relative to the second main body 30, and the flexible screen 40 is driven to be folded, so that the foldable terminal device 100 can be folded. For a folded state of the foldable terminal device 100, refer to FIG. 3 and FIG. 4. FIG. 3 is a schematic diagram of a structure of the foldable terminal device 100 in the folded state. The first main body 20 is equivalent to rotating relative to the second main body 30 by 180° from the state shown in FIG. 1. In this way, the first main body 20 and the second main body 30 are relatively parallel, the flexible screen 40 is bent, and the foldable terminal device 100 is folded. Correspondingly, with reference to an exploded view of the foldable terminal device 100 in the folded state shown in FIG. 4, it can be clearly seen that the rotating shaft mechanism 10 structurally deforms, the first main body 20 is driven to rotate relative to the second main body 30, and finally the foldable terminal device 100 can be folded.

Figure 5:
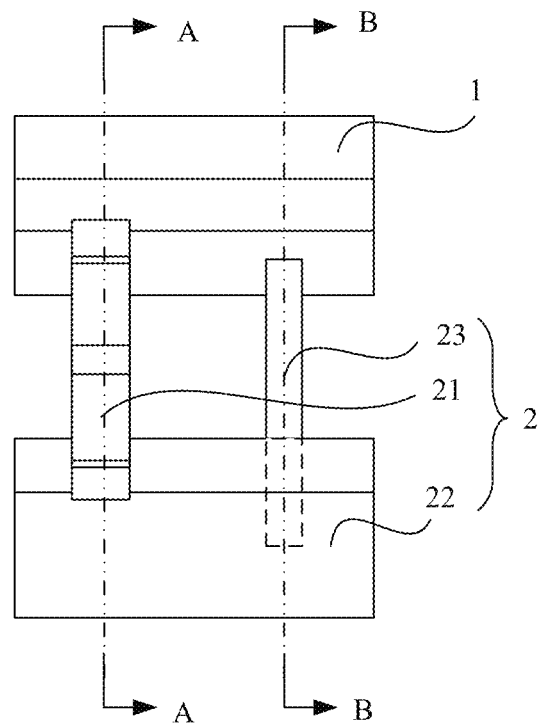
FIG. 5 is a schematic diagram of a structure of a rotating shaft mechanism according to this application.

In the foldable terminal device 100, the rotating shaft mechanism 10 plays an important role. For a structure of the rotating shaft mechanism 10 provided in this embodiment, refer to FIG. 5. The rotating shaft mechanism 10 may include a main bracket 1 and at least one rotating assembly 2. Herein, the rotating assembly 2 can rotate relative to the main bracket 1 to switch between an unfolded state and a folded state. FIG. 5 shows the unfolded state. The rotating assembly 2 includes a rotating member 21, a middle frame 22, and a sliding member 23. It can be understood that, the structure shown in FIG. 5 is a simplified structure of the rotating shaft mechanism 10. For a coordinating structure formed by the structures in the rotating shaft mechanism 10, refer to a schematic diagram of a structure of a cross section A-A in FIG. 5 (shown in FIG. 6) and a schematic diagram of a structure of a cross section B-B in FIG. 5 (shown in FIG. 7). It can be understood that, at least two rotating assemblies 2 are disposed in the rotating shaft mechanism 10 in the foldable terminal device 100. Herein, description is provided by using an example in which only one rotating assembly 2 is disposed in the rotating shaft mechanism 10.

Figure 6:
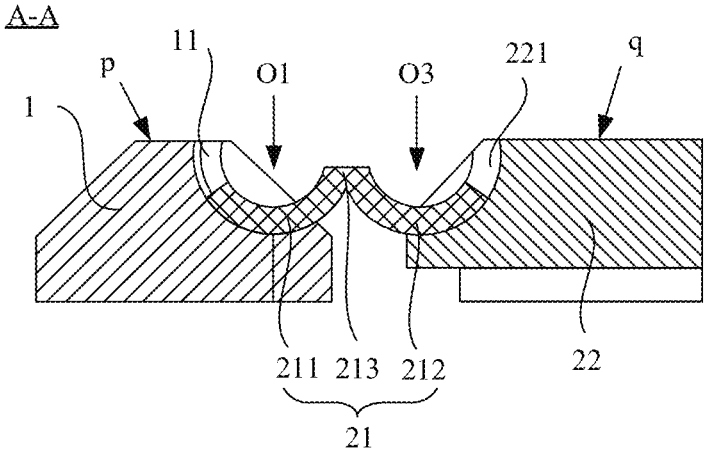
FIG. 6 is a schematic diagram of a structure of a cross section A-A in FIG. 5.

Referring to the cross-sectional structure of the rotating shaft mechanism 10 shown in FIG. 6, a first rotation center O1 is formed on the main bracket 1. It can be understood that, both the first rotation center O1 and a third rotation center O3 are displayed as virtual structures. The rotating member 21 includes a first connecting portion 211, a second connecting portion 212, and a main body portion 213. The main body portion 213 is connected between the first connecting portion 211 and the second connecting portion 212. Specifically, the first connecting portion 211 and the second connecting portion 212 are both shown as arc structures, and a concave surface of the first connecting portion 211 and a concave surface of the second connecting portion 212 both face a side on which a bearing surface q of the middle frame 22 is located. Positions of the first connecting portion 211 and the second connecting portion 212 are equivalent to being left-right symmetrical (certainly, the structures are not necessarily symmetrically the same). A center of circle corresponding to the first connecting portion 211 coincides with the first rotation center O1, and a center of circle corresponding to the second connecting portion 212 coincides with the third rotation center O3. Correspondingly, a first arc sliding slot 11 is formed on the main bracket 1, and the first connecting portion 211 extends into the first arc sliding slot 11 to slidably coordinate with the first arc sliding slot 11, so that one end of the rotating member 21 is hinged to the main bracket 1. When the first connecting portion 211 slides along the first arc sliding slot 11, the rotating member 21 is equivalent to rotating relative to the main bracket 1 about the first rotation center O1. A second arc sliding slot 221 is formed on the middle frame 22, and the second connecting portion 212 extends into the second arc sliding slot 221 to slidably coordinate with the second arc sliding slot 221, so that the other end of the rotating member 21 is hinged to the middle frame 22. When the second connecting portion 212 slides along the second arc sliding slot 221, the middle frame 22 rotates relative to the rotating member 21 about the third rotation center O3. In the structure shown in FIG. 6, a bearing surface p of the main bracket 1 and the bearing surface q of the middle frame 22 are located on a same plane.

Figure 7:
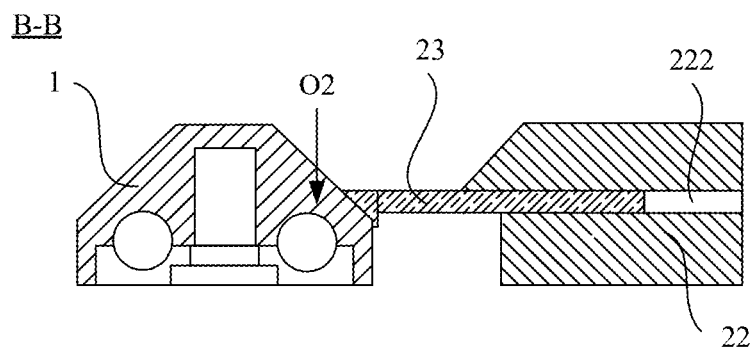
FIG. 7 is a schematic diagram of a structure of a cross section B-B in FIG. 5.
Figure 8:
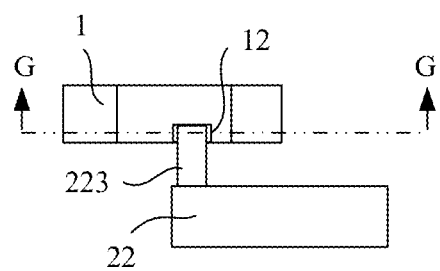
FIG. 8 is a schematic diagram of a structure for coordination of a sliding member between a main bracket and a middle frame in a rotating shaft mechanism according to this application.
Figure 9:
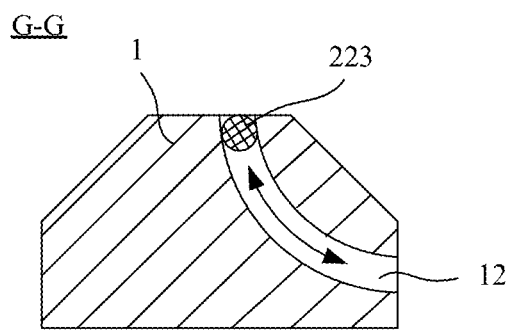
FIG. 9 is a schematic diagram of a structure of a cross section G-G in FIG. 8.

For the sliding member 23, refer to the cross-sectional structure of the rotating shaft mechanism 10 shown in FIG. 7. A second rotation center O2 is formed on the main bracket 1. When another structure is hinged to the main bracket 1, if a hinge point thereof coincides with the second rotation center O2, the structure can rotate relative to the main bracket 1 about the second rotation center O2. One end of the sliding member 23 is hinged to the main bracket 1, and a hinge point between the sliding member 23 and the main bracket is the second rotation center O2. Therefore, the sliding member 23 can rotate relative to the main bracket 1 about the second rotation center O2. The other end of the sliding member 23 slidably coordinates with the middle frame 22. For details, refer to FIG. 7. A sliding slot 222 is formed on the middle frame 22, and the sliding member 23 has a rod-shaped structure, so that the sliding member 23 can slidably coordinate with the sliding slot 222. It can be understood that, the sliding member 23 herein may be turned around relative to a connecting structure between the main bracket 1 and the middle frame 22. To be specific, one end of the sliding member 23 is hinged to the middle frame 22, and the other end of the sliding member 23 slidably coordinates with the main bracket 1, to achieve a same technical effect. In addition, a coordination manner of the sliding member 23 between the middle frame 22 and the main bracket 1 may be further implemented by using another structure. As shown in FIG. 8, in a possible coordination manner, a sliding pin 223 is formed on the middle frame 22, and an arc sliding rail 12 is formed on the main bracket 1. Further, FIG. 9 shows a cross section G-G in FIG. 8. It can be understood that, when the rotating assembly 2 rotates relative to the main bracket 1, the sliding pin 223 can slide in the arc sliding rail 12, and can form a constraint between the main bracket 1 and the middle frame 22. Herein, axes of the first rotation center O1, the second rotation center O2, and the third rotation center O3 are parallel to each other. It can be learned from FIG. 6 and FIG. 7 that, when the rotating assembly 2 is in the unfolded state relative to the main bracket 1, the second rotation center O2 is located on a side that is of a plane on which the axes of the first rotation center O1 and the third rotation center O3 are located and that is away from the bearing surface of the middle frame 22. This can prevent "reverse folding" caused by continued rotation performed by the rotating assembly 2 relative to the main bracket 1 from the unfolded state. Therefore, the whole rotating shaft mechanism 10 has a relatively high anti-reverse-folding capability and higher stability.

Figure 10:
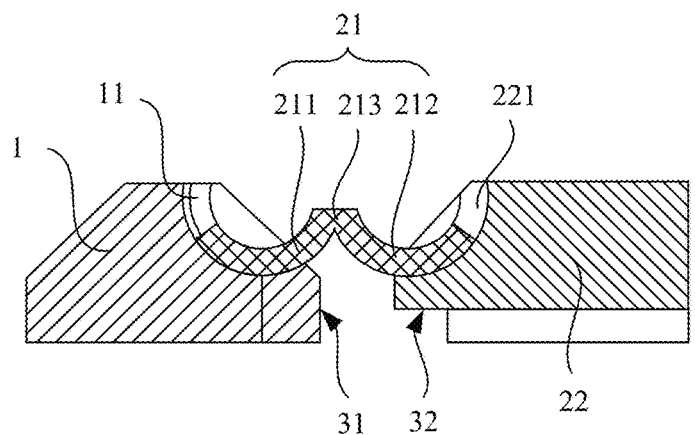
FIG. 10 is a schematic diagram of a limiting structure in a case that a rotating shaft mechanism is in an unfolded state according to this application.
Figure 11:
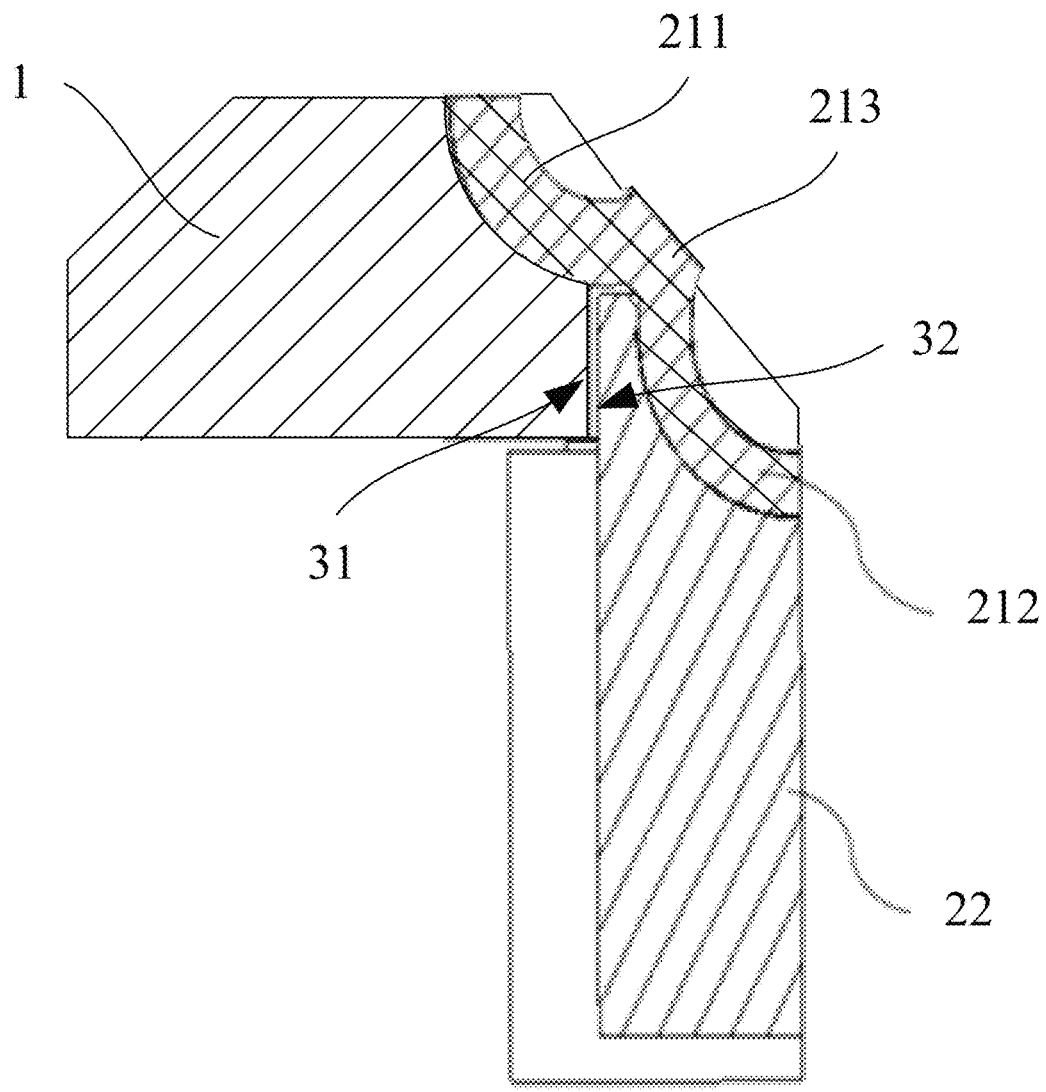
FIG. 11 is a schematic diagram of a limiting structure in a case that a rotating shaft mechanism is in a folded state according to this application.

When the rotating assembly 2 rotates relative to the main bracket 1, a limiting structure for limiting a maximum angle between folding and unfolding of the rotating shaft mechanism 10 is disposed. Specifically, for rotation of the rotating assembly 2 relative to the main bracket 1 into the folded state, referring to FIG. 10, the limiting structure may include a first limiting surface 31 formed on the main bracket 1 and a second limiting surface 32 formed on the rotating assembly 2. In the structure shown in FIG. 10, the rotating assembly 2 and the main bracket 1 are equivalent to being in the unfolded state. The first limiting surface 31 and the second limiting surface 32 are equivalent to being in a mutually perpendicular state. When the rotating assembly 2 rotates relative to the main bracket 1 into the folded state, states of the middle frame 22 and the main bracket 1 are shown in FIG. 11, and the first limiting surface 31 comes into contact and interference with the second limiting surface 32, so as to prevent the middle frame 22 from continuing to rotate relative to the main bracket 1. Herein, a maximum rotation angle of the rotating assembly 2 relative to the main bracket 1 may be defined as 90°. To be specific, the middle frame 22 may rotate from an unfolded state (which is equivalent to that an included angle between the middle frame 22 and the main bracket 1 is 180°) shown in FIG. 10 by 900 to a folded state shown in FIG. 11 (which is equivalent to that an included angle between the middle frame 22 and the main bracket 1 is 90°). It should be noted that, FIG. 10 and FIG. 11 show only one possibly implementable structure. Certainly, the structure between the main bracket 1 and the middle frame 22 of the rotating shaft mechanism 10 may further be illustrated in another form. Details are not described herein.

For rotation of the rotating assembly 2 relative to the main bracket 1 into the unfolded state, in a possible implementation, the limiting structure further includes a limiting member that may be disposed between the main bracket 1 and the middle frame 22. When the rotating assembly 2 rotates relative to the main bracket 1 into the unfolded state, the limiting member comes into contact and interference with the main bracket 1 and the rotating assembly 2 (for example, the middle frame 22). The limiting member herein may be a separate structure, or may be a part of the rotating assembly 2, a part of the main bracket 1, or another structure of the rotating shaft mechanism 10. The limiting member is described by using an example below, and therefore is not illustrated herein.

Further referring to the rotating shaft mechanism 10 in the unfolded and folded states respectively shown in FIG. 10 and FIG. 11, in a process in which the middle frame 22 rotates relative to the main bracket 1 from the state shown in FIG. 10 to the state shown in FIG. 11, the first connecting portion 211 of the rotating member 21 slides clockwise along the first arc sliding slot 11. This is equivalent to that the rotating member 21 rotates clockwise about the first rotation center O1. The second connecting portion 212 of the rotating member 21 slides counterclockwise along the second arc sliding slot 221. This is equivalent to that the middle frame 22 rotates clockwise about the third rotation center O3. When the middle frame 22 rotates relative to the main bracket 1 to the maximum stroke (that is, the state shown in FIG. 11), the first connecting portion 211 does not protrude from a surface of the main bracket 1, and the second connecting portion 212 does not protrude from a surface of the middle frame 22, so that when the rotating shaft mechanism 10 is in the folded state, the rotating member 21 does not affect an external structure of the rotating shaft mechanism 10, and the rotating shaft mechanism 10 can be more conveniently applied to the foldable terminal device 100.

Figure 12:
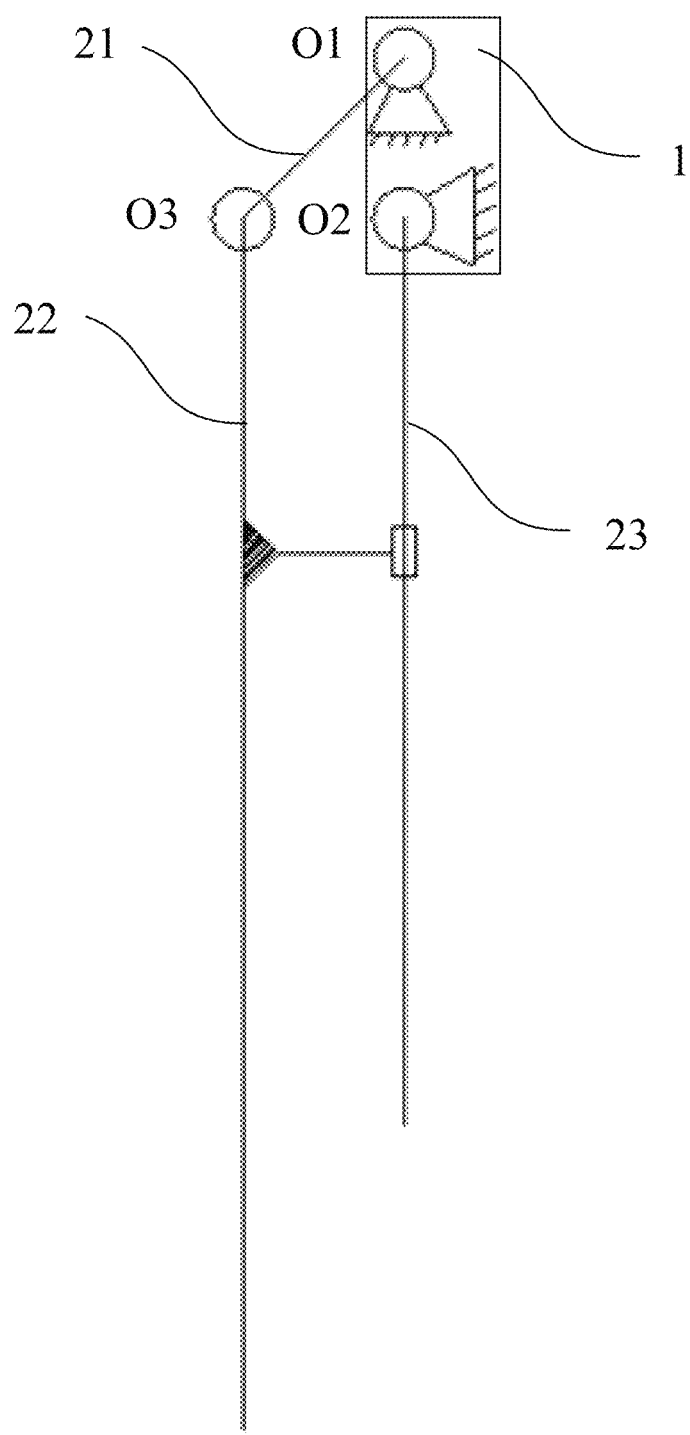
FIG. 12 is a schematic diagram of a structural principle of a rotating shaft mechanism according to this application.

With reference to the structure of the rotating shaft mechanism 10 shown in FIG. 5 to FIG. 11, it can be seen that, the rotating member 21 can rotate relative to the main bracket 1 about the first rotation center O1, the middle frame 22 can rotate relative to the rotating member 21 about the third rotation center O3, one end of the sliding member 23 can rotate relative to the main bracket 1 about the second rotation center O2, and the other end of the sliding member 23 can slide relative to the middle frame 22. Therefore, the whole rotating shaft mechanism 10 is limited to only one degree of freedom, and the structure of the whole rotating shaft mechanism 10 may be simplified into a structure shown in FIG. 12, so that the middle frame 22 can finally rotate relative to the main bracket 1 to implement a folding effect. The whole structure is simple, has a small vacant position, and has relatively high stability. When the rotating shaft mechanism 10 is applied to, for example, the foldable terminal device 100 shown in FIG. 1, the flexible screen 40 can be provided with stable support.

Figure 13:
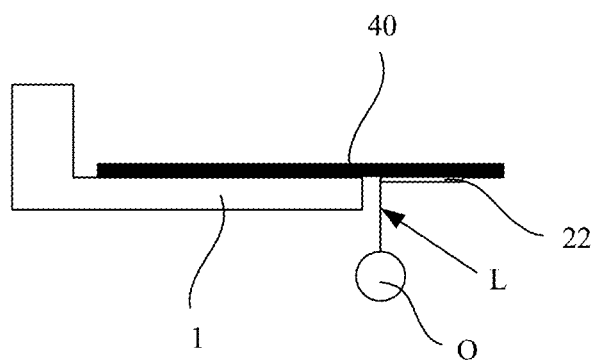
FIG. 13 is a schematic diagram of a principle of implementing an unfolded state through coordination between a rotating shaft mechanism and a flexible screen according to this application.
Figure 14:
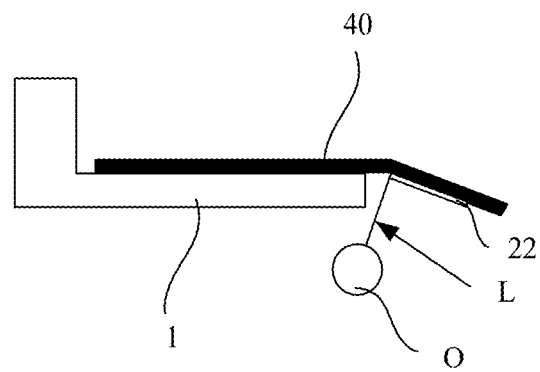
FIG. 14 is a schematic diagram of a principle of implementing a bent state through coordination between a rotating shaft mechanism and a flexible screen according to this application.
Figure 15:
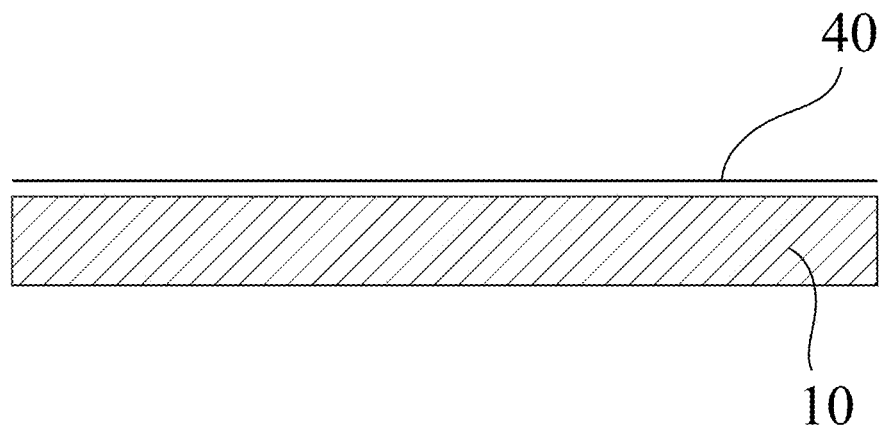
FIG. 15 is a schematic diagram of an unfolded state implemented through coordination between a rotating shaft mechanism and a flexible screen according to this application.
Figure 16:
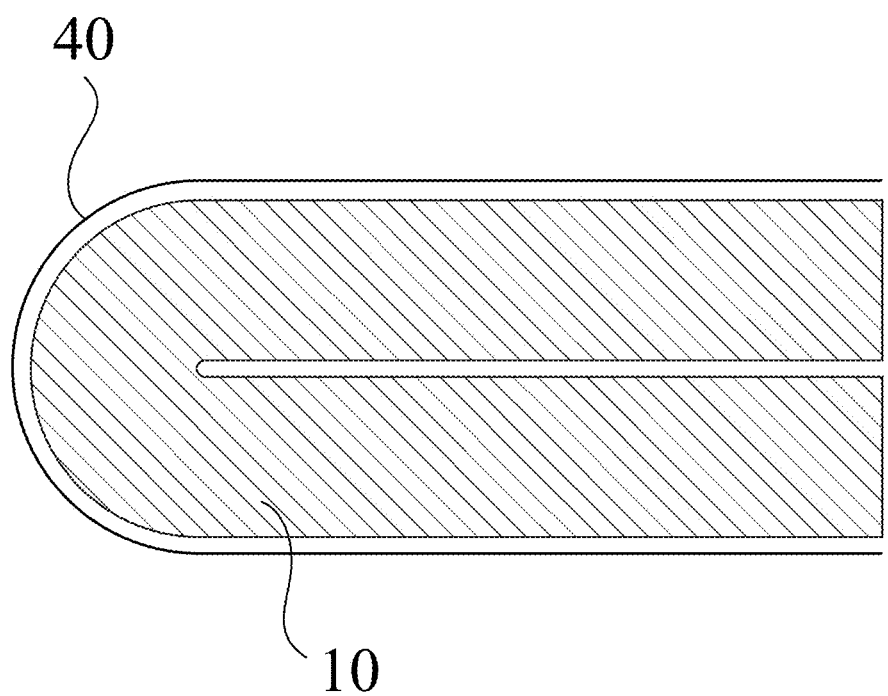
FIG. 16 is a schematic diagram of a bent state implemented through coordination between a rotating shaft mechanism and a flexible screen according to this application.

In addition, when the rotating shaft mechanism 10 is applied to, for example, the foldable terminal device 100 shown in FIG. 1, a state in which the middle frame 22 of the rotating shaft mechanism 10 rotates relative to the main bracket 1 may be described by using the structures shown in FIG. 13 and FIG. 14 as examples. In FIG. 13, the main bracket 1 and the middle frame 22 are equivalent to being in the unfolded state, and the flexible screen 40 is attached to the main bracket 1 and the middle frame 22. A virtual rotation center O about which the middle frame 22 rotates relative to the main frame 1 is set (certainly, in the actual rotating shaft mechanism 10, there is a more complex connection relationship between the main bracket 1 and the middle frame 22; herein, only the basic action "rotation" of the middle frame 22 relative to the main bracket 1 is used as an example for description; and the virtual rotation center O herein is equivalent to a virtual rotation center about which the middle frame 22 simply rotates relative to the main bracket 1), and a distance from the rotation center O to the flexible screen 40 is L. When the middle frame 22 rotates clockwise relative to the main bracket 1 about the virtual rotation center O, and the flexible screen 40 is bent along with the middle frame 22. With reference to FIG. 13 and FIG. 14, in a process in which the middle frame 22 rotates relative to the main bracket 1, if L is less than 0 (the virtual rotation center O is above the flexible screen 40), the flexible screen 40 is squeezed; or if L is greater than 0 (the virtual rotation center O is below the flexible screen 40, as in a state shown in FIG. 13 or FIG. 14), the flexible screen 40 is stretched. In addition, a larger size of L indicates that the flexible screen 40 is stretched longer. Therefore, a size of L is properly adjusted based on an actual application requirement, so that an unfolding length of the flexible screen 40 (an unfolded state is shown in FIG. 15) is roughly equal to a folding length thereof (a folded state is shown in FIG. 16). That is, folding and unfolding of the flexible screen 40 do not encounter a squeezing or stretching problem, thereby reducing a failure risk of the flexible screen 40.

Figure 17:
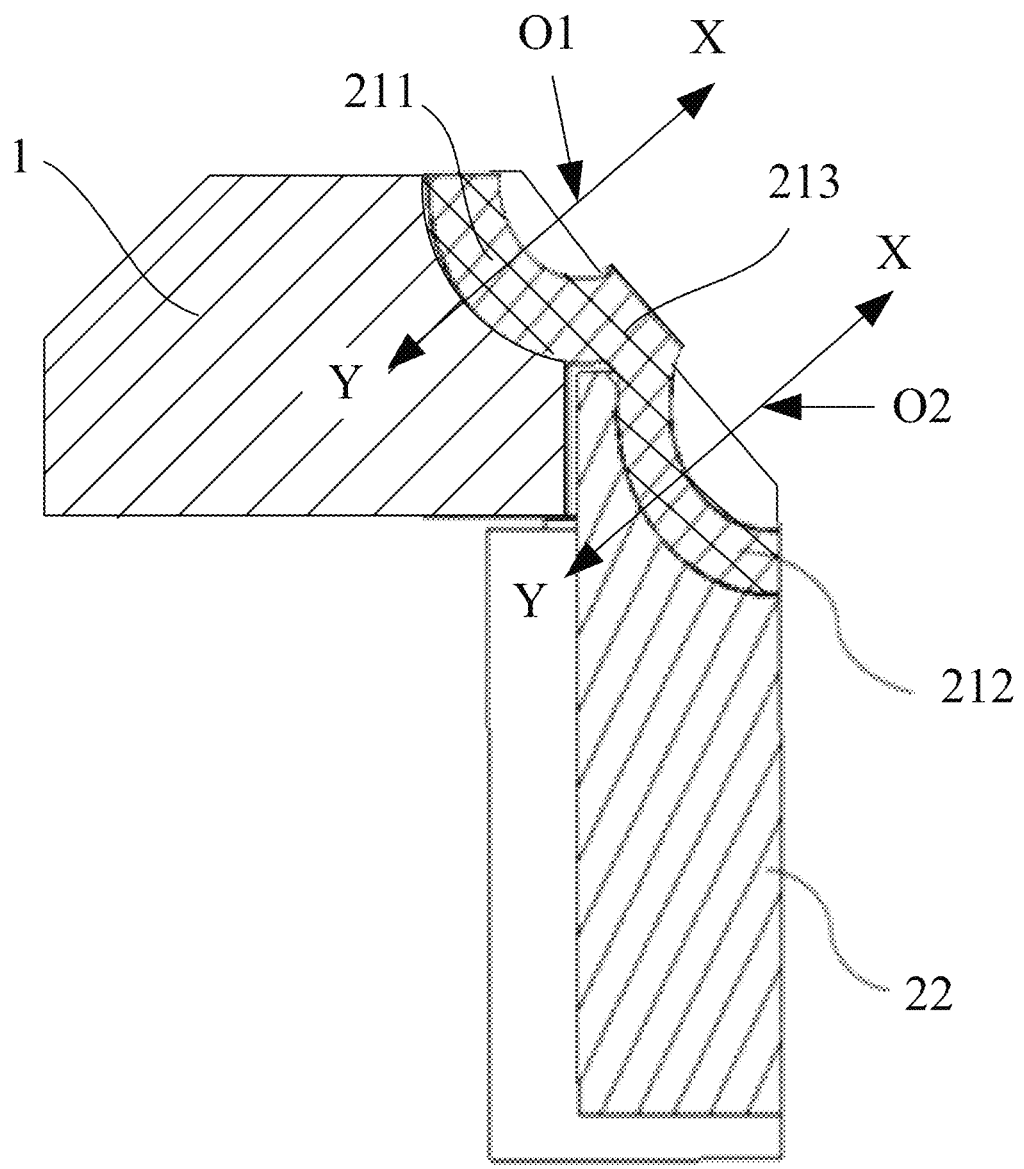
FIG. 17 is a schematic diagram of a principle of adjusting a rotation center by a rotating shaft mechanism according to this application.

Based on the foregoing theory, in the rotating shaft mechanism 10 provided in this embodiment, the first rotation center O1 between the main bracket 1 and the rotating member 21 and the third rotation center O3 between the rotating member 21 and the middle frame 22 may be adjusted with reference to an X-Y direction shown in FIG. 17. That is, a position of the virtual rotation center O may be adjusted, so that L is adjusted and finally the flexible screen 40 can meet a condition that the unfolding length is roughly equal to the folding length, thereby preventing the flexible screen 40 from being stretched or squeezed. It should be noted that, the second rotation center O2 between the main bracket 1 and the sliding member 23 only implements a constraint, but does not affect the virtual rotation center O about which the middle frame 22 rotates relative to the main bracket 1.

Figure 18:
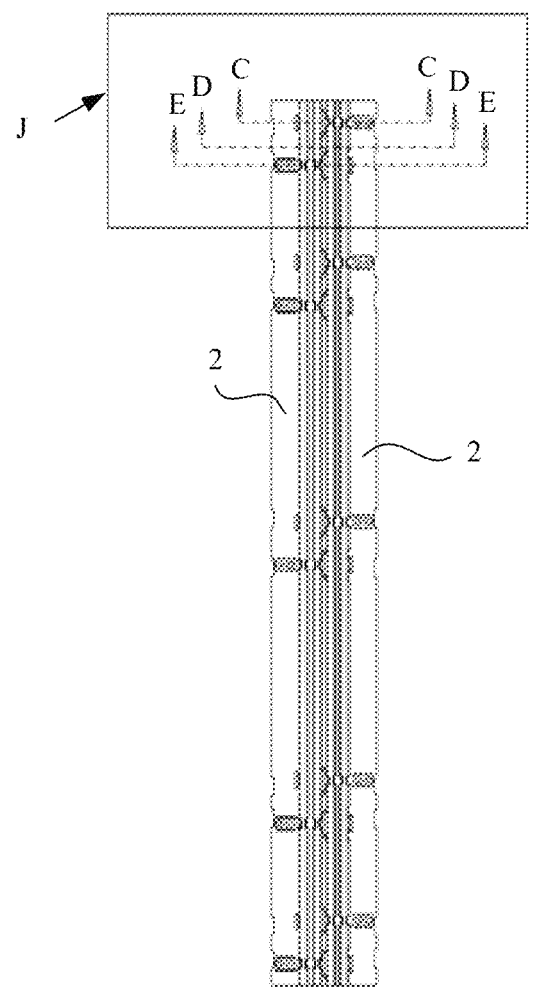
FIG. 18 is a top view of an unfolded state of a rotating shaft mechanism according to this application.

Referring to the foldable terminal device 100 shown in FIG. 1 and FIG. 3, the first main body 20 and the second main body 30 of the foldable terminal device 100 can implement folding and unfolding by 180°. FIG. 18 is a top view of an unfolded state of a rotating shaft mechanism 10 applied to a foldable terminal device 100. The rotating shaft mechanism 10 includes a main bracket 1 (the main bracket 1 is not shown in FIG. 18 due to a limitation on an angle of view) and a plurality of rotating assemblies 2. The rotating assemblies 2 are divided into a first rotating group (a left half structure in FIG. 18) and a second rotating group (a right half structure in FIG. 18). It can be understood that, the main bracket 1 is disposed between the first rotating group and the second rotating group.

Figure 19:
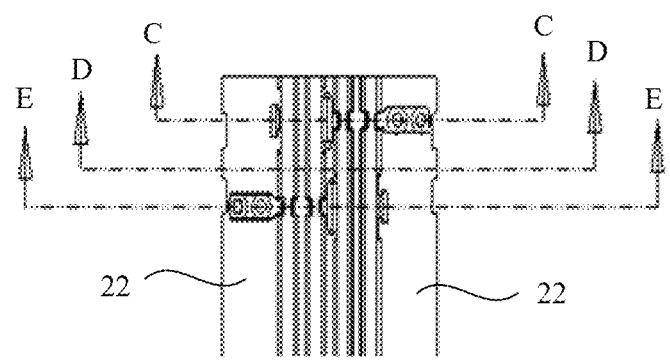
FIG. 19 is an enlarged view of a part J in FIG. 18.

An enlarged view shown in FIG. 19 is obtained by enlarging a structure of a part J in a box in FIG. 18. A middle frame 22 in each rotating assembly 2 in the first rotating group has an integral structure, and rotating actions of all the rotating assemblies 2 in the first rotating group are synchronous, so that the middle frame 22 in the first rotating group can rotate relative to the main bracket 1 to implement folding of 90°. A middle frame 22 in each rotating assembly 2 in the second rotating group also has an integral structure, and rotating actions of all the rotating assemblies 2 in the second rotating group are synchronous, so that the middle frame 22 in the second rotating group can rotate relative to the main bracket 1 to implement folding of 90°. A first main body 20 in the foldable terminal device 100 is connected to the middle frame 22 (namely, a left middle frame 22 in FIG. 19) in the first rotating group, and a second main body 30 is connected to the middle frame 22 (namely, a right middle frame 22 in FIG. 19) in the second rotating group. This can implement an effect that the first main body 20 of the foldable terminal device 100 is unfolded and folded by 180° relative to the second main body 30, thereby further implement folding and unfolding of the flexible screen 40.

Figure 20:
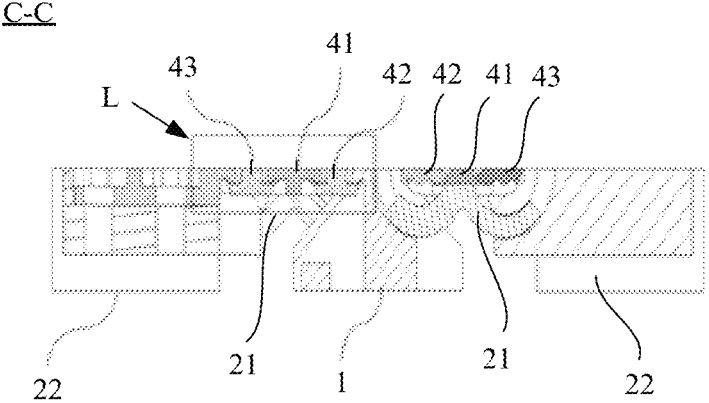
FIG. 20 is a schematic diagram of a structure of a cross section C-C in FIG. 18.

Further referring to FIG. 19, to describe the structure of the rotating shaft mechanism 10 in FIG. 18 in detail, a screenshot is captured on the part J in FIG. 18 along a plane on which C-C is located, to obtain a schematic diagram of a structure of the C-C section that is shown in FIG. 20 and that is of the rotating shaft mechanism 10.

Referring to FIG. 20, two rotating assemblies 2 are respectively disposed on left and right sides of the main bracket 1 (only the rotating member 21 and the middle frame 22 of the rotating assembly 2 are shown in FIG. 20, and the sliding member 23 is not shown). The two rotating assemblies 2 are staggered along a direction perpendicular to the cross-section in FIG. 20 (certainly, the two rotating assemblies 2 may alternatively be symmetrically distributed). Therefore, different partial structures are presented for the two rotating assemblies 2 in FIG. 20. In FIG. 20, a first screen support member 41 is disposed on the rotating member 21, and is configured to support the flexible screen 40. The first screen support member 41 herein may be fixed on the rotating member 21 through bonding, welding, riveting, screw connection, or another manner. To provide more stable and reliable support for the flexible screen 40, a second screen support member 42 may be further movably disposed between the first screen support member 41 and the main bracket 1, and a third screen support member 43 may be further movably disposed between the first screen support member 41 and the middle frame 22. Certainly, herein, only the second screen support member 42 may be disposed between the first screen support member 41 and the main bracket 1, or only the third screen support member 43 may be disposed between the first screen support member 41 and the middle frame 22. Alternatively, the second screen support member 42 may be disposed between the first screen support member 41 and the main bracket 1, and the third screen support member 43 may be disposed between the first screen support member 41 and the middle frame 22. As shown in FIG. 20, the second screen support member 42 is disposed between the first screen support member 41 and the main bracket 1, and the third screen support member 43 is disposed between the first screen support member 41 and the middle frame 22.

Figure 21:
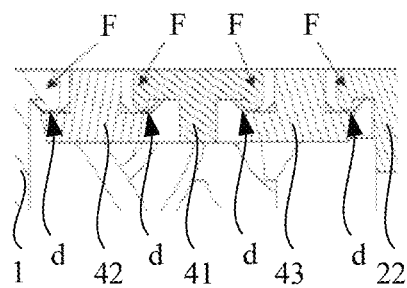
FIG. 21 is an enlarged view of a part L in FIG. 20.

The second screen support member 42 is movable. To limit the second screen support member 42 between the first screen support member 41 and the main bracket 1, with reference to an enlarged view that is of a part L in FIG. 20 and that is shown in FIG. 21, the first screen support member 41 and the main bracket 1 may be made to coordinate to form an overlapping surface d, and the second screen support member 42 overlaps the overlapping surface d. Similarly, for the second screen support member 42 disposed between the first screen support member 41 and the middle frame 22, the first screen support member 41 and the middle frame 22 are made to coordinate to form an overlapping surface d, and the second screen support member 42 overlaps the overlapping surface d. In FIG. 21, coordination between the first screen support member 41 and the second screen support member 42 is used as an example. The first screen support member 41 forms the foregoing overlapping surface d in a manner of a captive hook F, and the second screen support member 42 can coordinate with the first screen support member 41 by using a structure that can match a structure of the captive hook F, so that the captive hook F of the first screen support member 41 can limit the second screen support member 42. Certainly, a coordinating structure formed by the second screen support member 42 and the main bracket 1 is similar to a state shown in FIG. 21, and coordination between the third screen support member 43 and each of the first screen support member 41 and the middle frame 22 is also similar to that in FIG. 20. Details are not described herein again. In addition, a limitation by the main bracket 1 and the first screen support member 41 on the second screen support member 42 and the middle frame 22, and a limitation by the first screen support member 41 on the third screen support member 43 may be further implemented in other forms. This is not limited in this application. It should be noted that, the structure of the captive hook F is used herein in consideration that the second screen support member 42 and the third screen support member 43 rotate relative to the first screen support member 41, the main bracket 1, and the middle frame 22 when the rotating assembly 2 rotates relative to the main bracket 1. A groove formed by the captive hook F can provide the second screen support member 42 and the third screen support member 43 with a rotation space margin required for rotation.

Still referring to FIG. 20, the rotating assembly 2 herein is in an unfolded state relative to the main bracket 1. Herein, a bearing surface of the first screen support member 41, a bearing surface of the second screen support member 42, a bearing surface of the third screen support member 43, a bearing surface of the main bracket 1, and a bearing surface of the middle frame 22 are located on a same plane. Herein, the first screen support member 41, the second screen support member 42, and the third screen support member 43 may serve as limiting members disposed between the main bracket 1 and the rotating assembly 2, and can limit a maximum stroke of rotation performed by the rotating assembly 2 relative to the main bracket 1 into the unfolded state.

Figure 22:
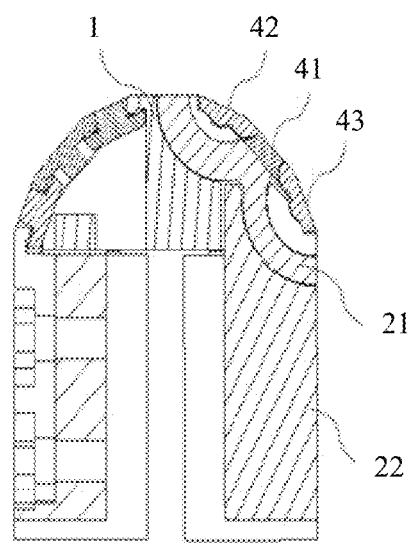
FIG. 22 is a schematic diagram of a folded state of the structure shown in FIG. 20.

The two rotating assemblies 2 shown in FIG. 20 are kept flush with the main bracket 1 (this is equivalent to the unfolded state of the rotating shaft mechanism 10). The rotating assembly 2 on the left side in FIG. 20 rotates counterclockwise by 90° relative to the main bracket 1, and the rotating assembly 2 on the right side therein rotates clockwise by 90° relative to the main bracket 1, to obtain a folded state of the rotating shaft mechanism 10 shown in FIG. 22. The rotating member 21 does not protrude from a surface of the main bracket 1 and a surface of the middle frame 22, and an outer surface of the whole rotating shaft mechanism 10 is kept relatively flush. This can provide a good support effect for the flexible screen 40.

Figure 23:
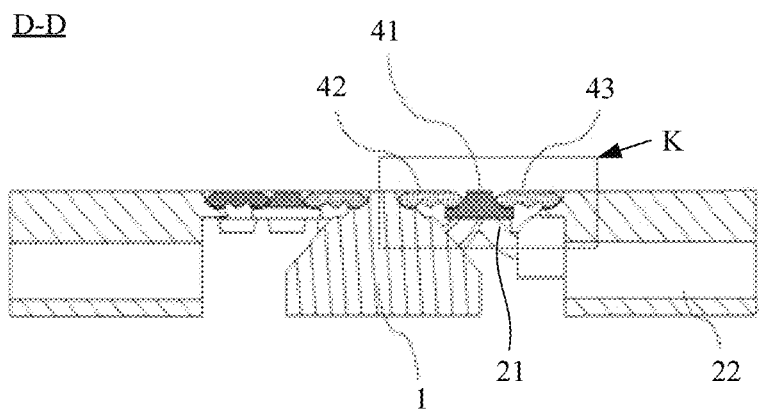
FIG. 23 is a schematic diagram of a structure of a cross section D-D in FIG. 18.
Figure 24:
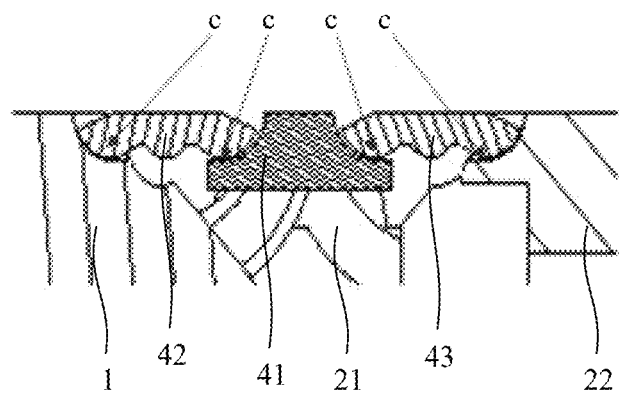
FIG. 24 is an enlarged view of a part K in FIG. 23.

A screenshot is captured on the part J in FIG. 18 along a plane on which D-D is located, to obtain a schematic diagram of a structure of the D-D section that is shown in FIG. 23 and that is of the rotating shaft mechanism 10. The main bracket 1, the middle frame 22, the rotating member 21, the first screen support member 41, and the second screen support member 42 shown in FIG. 23 have structures different from those shown in FIG. 20, because cross sections of the structures vary along a length direction of the rotating shaft mechanism 10 shown in FIG. 18. However, it can be understood that, changes in the structures do not affect functional implementation of the structures. FIG. 23 shows coordination relationships among the main bracket 1, the middle frame 22, the rotating member 21, the first screen support member 41, and the second screen support member 42. A structure of a part K in a box in FIG. 23 is enlarged to obtain an enlarged view shown in FIG. 24. It can be seen that, to support the second screen support member 42, a support surface c is formed on the main bracket 1, the middle frame 22, and the first screen support member 41.

Figure 25:
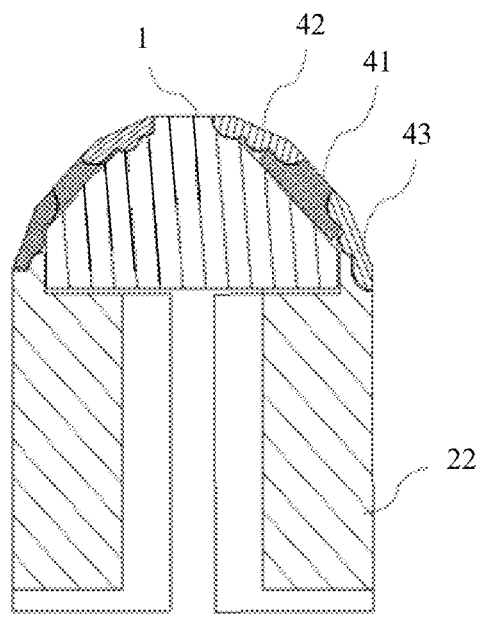
FIG. 25 is a schematic diagram of a folded state of the structure shown in FIG. 23.

The two rotating assemblies 2 shown in FIG. 23 are kept flush with the main bracket 1 (this is equivalent to the unfolded state of the rotating shaft mechanism 10). The rotating assembly 2 on a left side in FIG. 23 rotates counterclockwise by 90° relative to the main bracket 1, and the rotating assembly 2 on a right side therein rotates clockwise by 90° relative to the main bracket 1, to obtain a folded state of the rotating shaft mechanism 10 shown in FIG. 25. The rotating member 21 does not protrude from a surface of the main bracket 1 and a surface of the middle frame 22, and an outer surface of the whole rotating shaft mechanism 10 is kept relatively flush. This can provide a good support effect for the flexible screen 40.

Figure 26:
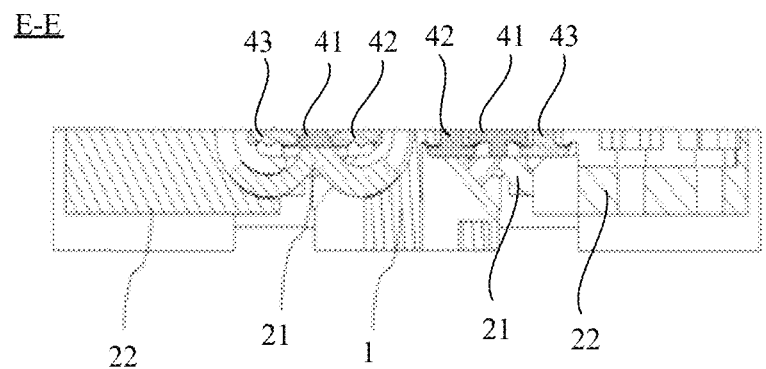
FIG. 26 is a schematic diagram of a structure of a cross section E-E in FIG. 18.
Figure 27:
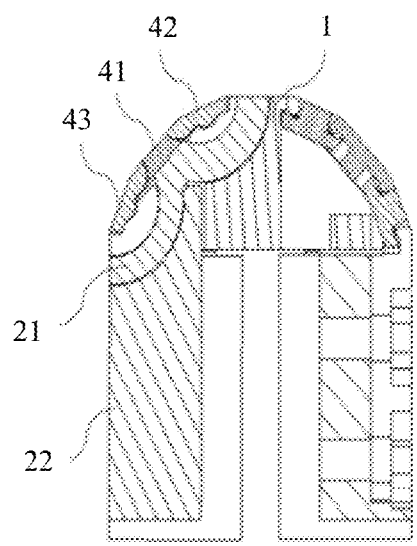
FIG. 27 is a schematic diagram of a folded state of the structure shown in FIG. 26.

A screenshot is captured on the part J in FIG. 18 along a plane on which E-E is located, to obtain a schematic diagram of a structure of the E-E section that is shown in FIG. 26 and that is of the rotating shaft mechanism 10. It can be seen that, a cross-sectional structure of the rotating shaft mechanism 10 shown in FIG. 26 is similar to the cross-sectional structure of the rotating shaft mechanism 10 shown in FIG. 20. The structure shown in FIG. 26 can be obtained by inverting the structure shown in FIG. 20 left and right. The two rotating assemblies 2 shown in FIG. 26 are kept flush with the main bracket 1 (this is equivalent to the unfolded state of the rotating shaft mechanism 10). The rotating assembly 2 on a left side in FIG. 26 rotates counterclockwise by 90° relative to the main bracket 1, and the rotating assembly 2 on a right side therein rotates clockwise by 90° relative to the main bracket 1, to obtain a folded state of the rotating shaft mechanism 10 shown in FIG. 27. A cross-sectional structure of the rotating shaft mechanism 10 shown in FIG. 27 is similar to the cross-sectional structure of the rotating shaft mechanism 10 shown in FIG. 22. The structure shown in FIG. 27 can be obtained by inverting the structure shown in FIG. 22 left and right.

In conclusion, a structure of the rotating shaft mechanism 10 provided in this application is simple, has a small vacant position, and has relatively high stability. When the rotating shaft mechanism 10 is applied to the foldable terminal device 100, the bearing surface of the main bracket 1 and the bearing surface of the middle frame 22 can bear the flexible screen 40 of the foldable terminal device 100. This can provide a good support effect for the flexible screen 40. In addition, provided that positions of the first rotation center O1 and the third rotation center O3 are properly arranged, the flexible screen 40 of the foldable terminal device 100 does not slide relative to the rotating shaft mechanism 10 in folding and unfolding processes, thereby reducing a failure risk of the flexible screen 40.

Obviously, a person skilled in the art can make various modifications and variations to embodiments of this application without departing from the scope of this application. This application is intended to cover these modifications and variations provided that they fall within the scope of protection defined by the following claims and their equivalent technologies.

What is claimed is:

1. A rotating shaft mechanism, comprising a main bracket and at least one rotating assembly, wherein each of the at least one rotating assembly can rotate relative to the main bracket, to switch between a folding state and an unfolding state, and a limiting structure configured to limit a maximum stroke of rotation performed by the rotating assembly relative to the main bracket is further disposed between the main bracket and the rotating assembly;

in a coordinating structure formed by the main bracket and any of the at least one rotating assembly, a first rotation center and a second rotation center are formed on the main bracket, wherein each of the at least one rotating assembly comprises a rotating member, a middle frame, and a sliding member, a third rotation center is formed on the middle frame, and axes of the first rotation center, the second rotation center, and the third rotation center are parallel to each other;

the rotating member comprises a first connecting portion, a second connecting portion, and a main body portion connected between the first connecting portion and the second connecting portion, wherein the first connecting portion can be rotatably connected to the main bracket about the first rotation center, and the second connecting portion can be rotatably connected to the middle frame about the third rotation center;

one end of the sliding member can be rotatably connected to the main bracket about the second rotation center, the other end of the sliding member slidably coordinates with the middle frame, so that the middle frame is away from or close to the second rotation center along an extension direction of the sliding member; and when the rotating assembly is in the unfolded state relative to the main bracket, a bearing surface of the main bracket and a bearing surface of the middle frame are located on a same plane.

2. The rotating shaft mechanism according to claim 1, wherein the first connecting portion and the second connecting portion are both arc structures, and a concave surface of the first connecting portion and a concave surface of the second connecting portion both face a side on which the bearing surface of the middle frame is located;

a first arc sliding slot is formed on the main bracket, and the first connecting portion extends into the first arc sliding slot to slidably coordinate with the first arc sliding slot;

a second arc sliding slot is formed on the middle frame, and the second connecting portion extends into the second arc sliding slot to slidably coordinate with the second arc sliding slot; and in a process in which the middle frame rotates relative to the main bracket, the first connecting portion does not protrude from the bearing surface of the main bracket, and the second connecting portion does not protrude from the bearing surface of the middle frame.

3. The rotating shaft mechanism according to claim 1, wherein a first screen support member is further disposed on the main body portion, and the first screen support member is configured to support an external structure; and
 when the rotating assembly is in the unfolded state relative to the main bracket, a bearing surface of the first screen support member, the bearing surface of the main bracket, and the bearing surface of the middle frame are located on the same plane.

4. The rotating shaft mechanism according to claim 3, wherein a second screen support member may be movably disposed between the first screen support member and the main bracket, and when the rotating assembly is in the unfolded state relative to the main bracket, a bearing surface of the second screen support member, the bearing surface of the first screen support member, the bearing surface of the main bracket, and the bearing surface of the middle frame are located on the same plane; and/or
 a third screen support member may be movably disposed between the first screen support member and the middle frame, and when the rotating assembly is in the unfolded state relative to the main bracket, a bearing surface of the third screen support member, the bearing surface of the first screen support member, the bearing surface of the main bracket, and the bearing surface of the middle frame are located on the same plane.

5. The rotating shaft mechanism according to claim 4, wherein the first screen support member and the main bracket coordinate to form an overlapping surface, and the second screen support member overlaps the overlapping surface, to limit the second screen support member between the first screen support member and the main bracket; and
 the first screen support member and the middle frame coordinate to form an overlapping surface, and the second screen support member overlaps the overlapping surface, to limit the second screen support member between the first screen support member and the middle frame.

6. The rotating shaft mechanism according to claim 1, wherein the limiting structure comprises a first limiting surface formed on the main bracket and a second limiting surface formed on the middle frame; and
 when the rotating assembly is in the folded state relative to the main bracket, the first limiting surface comes into contact and interference with the second limiting surface.

7. The rotating shaft mechanism according to claim 1, wherein the limiting structure further comprises a limiting member that may be disposed between the main bracket and the middle frame; and
 when the rotating assembly is in the unfolded state relative to the main bracket, the limiting member comes into contact and interference with the main bracket and the rotating assembly.

8. The rotating shaft mechanism according to claim 1, wherein
 when the rotating assembly is in the unfolded state relative to the main bracket, the second rotation center is located on a side that is of a plane on which the axes of the first rotation center and the third rotation center are located and that is away from the bearing surface of the middle frame.

9. A foldable terminal device, comprising a flexible screen and a rotating shaft mechanism, wherein the rotating shaft mechanism comprises a main bracket and at least one rotating assembly, wherein each of the at least one rotating assembly can rotate relative to the main bracket, to switch between a folding state and an unfolding state, and a limiting structure configured to limit a maximum stroke of rotation performed by the rotating assembly relative to the main bracket is further disposed between the main bracket and the rotating assembly;
 in a coordinating structure formed by the main bracket and any of the at least one rotating assembly, a first rotation center and a second rotation center are formed on the main bracket, wherein each of the at least one rotating assembly comprises a rotating member, a middle frame, and a sliding member, a third rotation center is formed on the middle frame, and axes of the first rotation center, the second rotation center, and the third rotation center are parallel to each other;
 the rotating member comprises a first connecting portion, a second connecting portion, and a main body portion connected between the first connecting portion and the second connecting portion, wherein the first connecting portion can be rotatably connected to the main bracket about the first rotation center, and the second connecting portion can be rotatably connected to the middle frame about the third rotation center;
 one end of the sliding member can be rotatably connected to the main bracket about the second rotation center, the other end of the sliding member slidably coordinates with the middle frame, so that the middle frame is away from or close to the second rotation center along an extension direction of the sliding member;
 when the rotating assembly is in the unfolded state relative to the main bracket, a bearing surface of the main bracket and a bearing surface of the middle frame are located on a same plane;
 and
 the flexible screen is disposed on a side on which the bearing surface of the main bracket and the bearing surface of the middle frame are located.

10. The foldable terminal device according to claim 9, wherein the first connecting portion and the second connecting portion are both arc structures, and a concave surface of the first connecting portion and a concave surface of the second connecting portion both face a side on which the bearing surface of the middle frame is located;
 a first arc sliding slot is formed on the main bracket, and the first connecting portion extends into the first arc sliding slot to slidably coordinate with the first arc sliding slot;
 a second arc sliding slot is formed on the middle frame, and the second connecting portion extends into the second arc sliding slot to slidably coordinate with the second arc sliding slot; and
 in a process in which the middle frame rotates relative to the main bracket, the first connecting portion does not protrude from the bearing surface of the main bracket, and the second connecting portion does not protrude from the bearing surface of the middle frame.

11. The foldable terminal device according to claim 9, wherein a first screen support member is further disposed on the main body portion, and the first screen support member is configured to support an external structure; and
 when the rotating assembly is in the unfolded state relative to the main bracket, a bearing surface of the first screen support member, the bearing surface of the main bracket, and the bearing surface of the middle frame are located on the same plane.

12. The foldable terminal device according to claim 11, wherein a second screen support member may be movably disposed between the first screen support member and the main bracket, and when the rotating assembly is in the unfolded state relative to the main bracket, a bearing surface of the second screen support member, the bearing surface of the first screen support member, the bearing surface of the main bracket, and the bearing surface of the middle frame are located on the same plane; and/or a third screen support member may be movably disposed between the first screen support member and the middle frame, and when the rotating assembly is in the unfolded state relative to the main bracket, a bearing surface of the third screen support member, the bearing surface of the first screen support member, the bearing surface of the main bracket, and the bearing surface of the middle frame are located on the same plane.

13. The foldable terminal device according to claim 12, wherein the first screen support member and the main bracket coordinate to form an overlapping surface, and the second screen support member overlaps the overlapping surface, to limit the second screen support member between the first screen support member and the main bracket; and the first screen support member and the middle frame coordinate to form an overlapping surface, and the second screen support member overlaps the overlapping surface, to limit the second screen support member between the first screen support member and the middle frame.

14. The foldable terminal device according to claim 9, wherein the limiting structure comprises a first limiting surface formed on the main bracket and a second limiting surface formed on the middle frame; and when the rotating assembly is in the folded state relative to the main bracket, the first limiting surface comes into contact and interference with the second limiting surface.

15. The foldable terminal device according to claim 9, wherein the limiting structure further comprises a limiting member that may be disposed between the main bracket and the middle frame; and when the rotating assembly is in the unfolded state relative to the main bracket, the limiting member comes into contact and interference with the main bracket and the rotating assembly.

16. The foldable terminal device according to claim 9, wherein when the rotating assembly is in the unfolded state relative to the main bracket, the second rotation center is located on a side that is of a plane on which the axes of the first rotation center and the third rotation center are located and that is away from the bearing surface of the middle frame.

17. The foldable terminal device according to claim 9, wherein when the rotating shaft mechanism comprises at least two rotating assemblies, and the at least two rotating assemblies are divided into a first rotating group and a second rotating group;

rotating actions of all rotating assemblies in the first rotating group are synchronous, and rotating actions of all rotating assemblies in the second rotating group are synchronous; and when each rotating assembly is unfolded relative to the main bracket, the flexible screen is in a flat-unfolded state.

18. The foldable terminal device according to claim 17, further comprising a first main body and a second main body, wherein a middle frame in the first rotating group is connected to the first main body, a middle frame in the second rotating group is connected to the second main body, and the first main body and the second main body are configured to bear the flexible screen.

* * * * *

UNITED STATES PATENT AND TRADEMARK OFFICE
CERTIFICATE OF CORRECTION

PATENT NO. : 12,335,420 B2  
APPLICATION NO. : 17/947396  
DATED : June 17, 2025  
INVENTOR(S) : Changliang Liao et al.

Page 1 of 1

It is certified that error appears in the above-identified patent and that said Letters Patent is hereby corrected as shown below:

In the Specification

Column 6, Line 67, change "1800" to --180°--;

Column 9, Line 9, change "900" to --90°--;

In the Claims

Column 18, Claim 17, Line 19, change "wherein when" to --wherein--.

Signed and Sealed this  
Fifteenth Day of July, 2025

Coke Morgan Stewart  
*Acting Director of the United States Patent and Trademark Office*